United States Patent
Saito et al.

(10) Patent No.: US 9,200,344 B2
(45) Date of Patent: Dec. 1, 2015

(54) HIGH STRENGTH HOT ROLLED STEEL SHEET HAVING EXCELLENT BENDABILITY AND METHOD FOR MANUFACTURING THE SAME

(75) Inventors: Hayato Saito, Fukuyama (JP); Katsumi Nakajima, Kawasaki (JP); Yoshimasa Funakawa, Chiba (JP); Noriaki Moriyasu, Chiba (JP); Takayuki Murata, Kawasaki (JP)

(73) Assignee: JFE Steel Corporation, Tokyo (JP)

( * ) Notice: Subject to any disclaimer, the term of this patent is extended or adjusted under 35 U.S.C. 154(b) by 125 days.

(21) Appl. No.: 13/821,144

(22) PCT Filed: Sep. 15, 2011

(86) PCT No.: PCT/JP2011/071754
§ 371 (c)(1),
(2), (4) Date: Mar. 6, 2013

(87) PCT Pub. No.: WO2012/036309
PCT Pub. Date: Mar. 22, 2012

(65) Prior Publication Data
US 2013/0167985 A1 Jul. 4, 2013

(30) Foreign Application Priority Data
Sep. 17, 2010 (JP) .................... 2010-209943

(51) Int. Cl.
| | |
|---|---|
| *C22C 38/28* | (2006.01) |
| *C21D 8/02* | (2006.01) |
| *C22C 38/24* | (2006.01) |
| *C21D 6/00* | (2006.01) |
| *C21D 9/46* | (2006.01) |
| *C22C 38/14* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/16* | (2006.01) |
| *C22C 38/38* | (2006.01) |
| *B32B 15/01* | (2006.01) |
| *C22C 38/18* | (2006.01) |

(52) U.S. Cl.
CPC ............ *C21D 8/0205* (2013.01); *B32B 15/013* (2013.01); *C21D 6/00* (2013.01); *C21D 8/0226* (2013.01); *C21D 8/0263* (2013.01); *C21D 9/46* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/24* (2013.01); *C22C 38/28* (2013.01); *C22C 38/38* (2013.01); *C21D 2211/002* (2013.01); *C21D 2211/005* (2013.01)

(58) Field of Classification Search
CPC ...... C21D 6/00; C21D 8/0205; C21D 8/0226; C21D 8/0263; C22C 38/18; C22C 38/14; C22C 38/001; C22C 38/02; C22C 38/04
USPC .......... 148/602, 337, 332, 336, 333, 330, 331
See application file for complete search history.

(56) References Cited

U.S. PATENT DOCUMENTS

| | | | |
|---|---|---|---|
| 4,472,208 A | 9/1984 | Kunishige | |
| 2011/0284137 A1* | 11/2011 | Kami et al. | ........... 148/504 |

FOREIGN PATENT DOCUMENTS

| | | | |
|---|---|---|---|
| EP | 2 053 139 A1 | 4/2009 | |
| EP | 2 184 373 A1 | 5/2010 | |
| JP | 2001-059129 A | 3/2001 | |
| JP | 2003-129175 A | 5/2003 | |
| JP | 2003-155541 A | 5/2003 | |
| JP | 2006-161111 A | 6/2006 | |
| JP | 2006-161139 A | 6/2006 | |
| JP | 2008202119 A * | 9/2008 | |
| JP | 2009-007653 A | 1/2009 | |
| JP | 2009-280900 A | 12/2009 | |
| JP | 2010-196164 A | 9/2010 | |
| WO | WO 2010087511 A1 * | 8/2010 | ............... C21D 8/02 |

OTHER PUBLICATIONS

International Search Report dated Dec. 27, 2011, application No. PCT/JP2011/071754.
Supplementary European Search Report for Application No. EP 11 82 5307 dated Aug. 17, 2015.

* cited by examiner

Primary Examiner — Rebecca Lee
(74) Attorney, Agent, or Firm — RatnerPrestia

(57) ABSTRACT

A steel sheet including C at 0.05 to 0.15%, Si at 0.2 to 1.2%, Mn at 1.0 to 2.0%, P at not more than 0.04%, S at not more than 0.0030%, Al at 0.005 to 0.10%, N at not more than 0.005% and Ti at 0.03 to 0.13%, the balance being Fe and inevitable impurities, includes surface regions having an area fraction of bainite of less than 80% and an area fraction of a ferrite phase with a grain diameter of 2 to 15 μm of not less than 10%, the surface regions extending from both surfaces of the steel sheet each to a depth of 1.5 to 3.0% relative to a total sheet thickness, as well as an inner region other than the surface regions having an area fraction of a bainite phase of more than 95%, and has a tensile strength of not less than 780 MPa.

4 Claims, No Drawings

US 9,200,344 B2

HIGH STRENGTH HOT ROLLED STEEL SHEET HAVING EXCELLENT BENDABILITY AND METHOD FOR MANUFACTURING THE SAME

CROSS REFERENCE TO RELATED APPLICATIONS

This application is the U.S. National Phase application of PCT International Application No. PCT/JP2011/071754, filed Sep. 15, 2011, and claims priority to Japanese Patent Application No. 2010-209943, filed Sep. 17, 2010, the disclosure of both are incorporated herein by reference in their entireties for all purposes.

FIELD OF THE INVENTION

The present invention relates to a high strength hot rolled steel sheet that exhibits a tensile strength of not less than 780 MPa and excellent bendability and is suitable for parts such as automobile structural parts and frames for trucks. The invention also relates to a method for manufacturing such steel sheets.

BACKGROUND OF THE INVENTION

Improving the fuel efficiency of automobiles has recently become an important issue from the viewpoint of global environment conservation. In order to achieve compatibility between fuel efficiency and crash safety of automobiles, active efforts have been made to reduce the weight of car bodies themselves by reducing the thickness of parts while increasing the strength of materials used. While hot rolled steel sheets heretofore used for automobile parts have a grade in terms of tensile strength of 440 MPa or 590 MPa, there has recently been an increasing need for high strength hot rolled steel sheets having a grade of 780 MPa or higher.

However, increasing the strength of steel sheets is generally accompanied by a decrease in formability. Thus, various attempts have been made in order to improve formability such as bendability required for steel sheets to be used as automobile parts and the like.

For example, patent document 1 describes a hot rolled steel sheet which has a steel composition containing, in terms of mass, C at more than 0.055% and less than 0.15%, Si at less than 1.20, Mn at more than 0.5% and less than 2.5%, Al at less than 0.5%, P at less than 0.1%, S at less than 0.01%, N at less than 0.008%, and one or two or more selected from the group consisting of V at more than 0.03% and less than 0.5%, Ti at more than 0.003% and less than 0.2%, Nb at more than 0.003% and less than 0.1% and Mo at more than 0.03% and less than 0.2% while satisfying Expression (1) below, the balance being represented by Fe and inevitable impurities, and which includes a steel microstructure that contains not less than 70% by volume of equiaxed ferrite with a Vickers hardness $Hv_\alpha$ defined by Expression (2) below and 0 to 5% by volume of martensite, the balance being represented by one, or two or more selected from ferrite excluding the equiaxed ferrite, bainite, cementite and pearlite.

$$0.04 < C - (Ti - 3.43N) \times 0.25 - Nb \times 0.129 - V \times 0.235 - Mo \times 0.125 < 0.05 \quad (1)$$

$$Hv_\alpha \geq 0.3 \times TS + 10 \quad (2)$$

According to the technique described in patent document 1, the hot rolled steel sheet configured to contain hard equiaxed ferrite at not less than 70% exhibits excellent bendability with a critical bending radius of not more than 0.5 mm in the case of a tensile strength of not less than 850 MPa and a sheet thickness of 1 mm.

Patent document 2 describes a method for manufacturing high strength hot rolled steel sheets having a tensile strength of not less than 780 MPa, which includes hot rolling a steel slab with a steel composition containing, in terms of mass %, C at 0.04 to 0.15%, Si at 0.05 to 1.5%, Mn at 0.5 to 2.0%, P at not more than 0.06%, S at not more than 0.005%, Al at not more than 0.10% and Ti at 0.05 to 0.20% at a finish temperature of 800 to 1000° C., thereafter cooling the steel sheet at a cooling rate of not less than 55° C./s and subsequently at a cooling rate of not less than 120° C./s for the temperature range of 500° C. and below so as to cool the steel sheet by nucleate boiling cooling, and coiling the steel sheet at 350 to 500° C.

According to the technique described in patent document 2, a high strength hot rolled steel sheet with a tensile strength of not less than 780 MPa is obtained which has a microstructure including more than 95% of bainite and less than 5% of irreversibly-formed other phases and exhibits excellent stretch flangeability after working as well as stability with small variations in quality within the steel sheet.

PATENT DOCUMENT

[Patent document 1] Japanese Unexamined Patent Application Publication No. 2006-161111

[Patent document 2] Japanese Unexamined Patent Application Publication No. 2009-280900

SUMMARY OF THE INVENTION

However, the technique described in patent document 1 entails simultaneous controlling of the ferrite transformation point and air cooling for not less than 7 seconds during a cooling process after hot rolling in order to make a percentage of hard equiaxed ferrite not less than 70%. Thus, stable manufacturing is difficult.

Further, while the technique described in patent document 2 can ensure a high strength of not less than 780 MPa in terms of tensile strength, the steel sheet does not still have sufficient bendability required for automobile parts because controlling of the bainite phase is insufficient.

Thus, it has been difficult for high strength hot rolled steel sheets with a tensile strength of not less than 780 Mpa as described above to achieve sufficient bendability. In particular, there has been a problem in that when such a steel sheet is subjected to forming such as bending after being blanked into a predetermined shape by shearing, cracks occur originating at a shear edge to cause a failure to obtain a desired shape.

The present invention solves the aforementioned problems in an advantageous manner. It is therefore an object of the invention to propose a high strength hot rolled steel sheet, as well as an advantageous method for manufacturing the same, which exhibits excellent bendability in spite of the tensile strength being increased to 780 MPa or above.

The present inventors studied approaches to improve the bendability of steel sheets with a tensile strength (TS) of not less than 780 MPa. As a result, the present inventors have obtained the following finding.

It has been found that a high strength hot rolled steel sheet with a tensile strength of not less than 780 MPa, even when it has a shear edge, exhibits good bendability and is prevented from the occurrence of cracks by configuring the steel sheet such that the main phase in an inner portion of the steel sheet is bainite, in detail, is a bainite single phase or contains bainite at a fraction exceeding 95% and the structure of surface portions of the steel sheet contains a bainite phase at a fraction of less than 80% and highly workable ferrite at a fraction of not less than 10%.

The present inventors carried out further studies based on the above finding and have completed the present invention.

That is, aspects of the present invention are summarized as follows.

1. A high strength hot rolled steel sheet with excellent bendability, which has a composition including, in terms of mass %, C at 0.05 to 0.15%, Si at 0.2 to 1.2%, Mn at 1.0 to 2.0%, P at not more than 0.04%, S at not more than 0.0030%, Al at 0.005 to 0.10%, N at not more than 0.005% and Ti at 0.03 to 0.13%, the balance being represented by Fe and inevitable impurities, includes surface regions having an area fraction of bainite of less than 80% and an area fraction of a ferrite phase with a grain diameter of 2 to 15 μm of not less than 10%, the surface regions extending from front and back surfaces of the steel sheet each to a depth of 1.5 to 3.0% relative to a total sheet thickness, as well as an inner region other than the surface regions having an area fraction of a bainite phase of more than 95%, and has a tensile strength of not less than 780 MPa.

2. The high strength hot rolled steel sheet with excellent bendability described in 1, wherein the composition of the steel sheet further includes, in terms of mass %, one, or two or more selected from Cu at 0.01 to 0.20%, Ni at 0.01 to 0.50%, Nb at 0.005 to 0.10%, V at 0.002 to 0.50%, Mo at 0.02 to 0.50%, Cr at 0.03 to 0.50% and B at 0.0002 to 0.0050%.

3. The high strength hot rolled steel sheet with excellent bendability described in 1 or 2, wherein the composition of the steel sheet further includes, in terms of mass %, one or both selected from Ca at 0.0003 to 0.005% and REM at 0.0003 to 0.0100%.

4. A method for manufacturing high strength hot rolled steel sheets with excellent bendability, including heating a steel material to a temperature of 1200 to 1350° C., the steel material having the chemical composition described in any of 1 to 3, holding the steel material at the temperature for not less than 1200 seconds, hot rolling the steel material to a steel sheet at a rough rolling end temperature of not less than 1050° C. and a finish rolling end temperature of 830 to 930° C., and after the completion of the hot rolling cooling the steel sheet to a coiling temperature of 350 to 550° C. at an average cooling rate of not less than 35° C./s.

According to the present invention, hot rolled steel sheets with improved bendability can be obtained stably while ensuring a high strength of not less than 780 MPa in terms of tensile strength. Thus, the present invention is highly valuable in industry.

The use of the inventive high strength hot rolled steel sheets for automobile structural parts and frames for trucks ensures safety of automobiles and enables weight saving of car bodies, thereby reducing the load on the environment.

DESCRIPTION OF EMBODIMENTS OF THE INVENTION

The present invention according to exemplary embodiments will be described in detail hereinbelow.

First, the reasons why the chemical composition of embodiments of the inventive high strength hot rolled steel sheets is limited to the aforementioned ranges will be described. The term "%" indicating the contents of respective elements means "mass %" unless otherwise mentioned.

C: 0.05 to 0.15%

Carbon is an effective element for increasing strength and promotes the formation of bainite. Carbon is also effective for increasing bendability because the addition of carbon lowers the bainite transformation point and refines the bainite microstructure. Thus, it is beneficial in the invention that the C content be not less than 0.05%. On the other hand, any C content exceeding 0.15% causes a marked decrease in bendability and a deterioration in weldability, and thus the upper limit of C content is specified to be 0.15%. Accordingly, the C content is in the range of 0.05 to 0.15%, and preferably 0.07 to 0.12%.

Si: 0.2 to 1.2%

Silicon is an element that contributes not only to an increase in bendability by suppressing the formation of coarse cementite, but also to solid solution hardening. In order to obtain these effects, silicon needs to be added at not less than 0.2%. On the other hand, any addition in excess of 1.2% results in a marked deterioration in surface quality of the steel sheets and leads to not only a decrease in bendability, but also decreases in chemical conversion properties and corrosion resistance. Thus, the upper limit of the Si content is specified to be 1.2%. The Si content is preferably in the range of 0.3 to 0.9%.

Mn: 1.0 to 2.0%

Manganese is an effective element for increasing strength and contributes to an increase in strength through solid solution hardening. In addition, this element contributes to an increase in bendability by improving hardenability and promoting the formation of bainite. In order to obtain these effects, manganese needs to be added at not less than 1.0%. On the other hand, any addition in excess of 2.0% results in marked central segregation and a consequent decrease in bendability. Thus, the Mn content is limited to be in the range of 1.0 to 2.0%. The Mn content is preferably in the range of 1.2% to 1.8%.

P: not more than 0.04%

Phosphorus has an effect of increasing the strength of steel by solid solution. However, this element is segregated in grain boundaries, in particular prior austenite grain boundaries, thereby causing a decrease in bendability. Thus, it is preferable in the invention that the P content be reduced as much as possible. However, a P content of up to 0.04% is acceptable. The P content is preferably not more than 0.02%.

S: not more than 0.0030%

Sulfur combines with titanium and manganese to form sulfides and lowers the bendability of steel sheets. Thus, it is desirable that the S content be reduced as much as possible. However, a S content of up to 0.0030% is acceptable. The S content is preferably not more than 0.0020%, and more preferably not more than 0.0010%.

Al: 0.005 to 0.10%

Aluminum is an element that works as a deoxidizer for steel and is effective for increasing the cleanliness of steel sheets. In order to obtain these effects, aluminum needs to be added at not less than 0.005%. On the other hand, any content in excess of 0.10% causes a marked increase in the amounts of oxide inclusions, resulting in not only a decrease in bendability but also the occurrence of surface defects on steel sheets. Thus, the Al content is limited to be in the range of 0.005 to 0.10%. The Al content is preferably in the range of 0.005 to 0.04%, and more preferably 0.005 to 0.02%.

N: not more than 0.005%

Nitrogen combines with nitride-forming elements such as titanium at a high temperature and is precipitated as nitrides. In particular, this element easily combines with titanium at a high temperature to form a coarse nitride, which tends to serve as a starting point of a crack during bending to cause a deterioration in the bending property, and thus it is preferable that the N content be reduced as much as possible. Thus, the upper limit is specified to be 0.005%. The N content is preferably not more than 0.003%.

Ti: 0.03 to 0.13%

Titanium contributes to an increase in bendability by contributing to reducing the size of austenite grains and thereby refining the microstructure of finally obtainable steel sheets. In order to obtain these effects, the Ti content needs to be not less than 0.03%. On the other hand, any excessive content exceeding 0.13% causes an increase in the amounts of coarse precipitates and a consequent decrease in bendability. Thus, the Ti content is limited to be in the range of 0.03 to 0.13%. The Ti content is preferably in the range of 0.04 to 0.11%.

The components described above are basic components. In addition to these components, the inventive steel sheet may contain one, or two or more selected from Cu, Ni, Nb, V, Mo, Cr and B in the following ranges as elements for improving the bendability and strength of the steel sheet.

Cu: 0.01 to 0.20%

Copper increases the strength of steel by functioning as a solid solute element and facilitates the formation of a bainite phase through an improvement of hardenability, thereby contributing to increasing strength and bendability. In order to obtain these effects, copper needs to be added at not less than 0.01%. However, any Cu content exceeding 0.20% leads to a decrease in surface quality. Thus, when copper is contained, the Cu content is preferably controlled to be in the range of 0.01 to 0.200.

Ni: 0.01 to 0.50%

Nickel increases the strength of steel by solid solution hardening and facilitates the formation of a bainite phase through an improvement of hardenability, thereby contributing to increasing strength and bendability. In order to obtain these effects, nickel needs to be added at not less than 0.010. If the Ni content exceeds 0.50%, however, a martensite phase is formed to lower bendability. Thus, when nickel is contained, the Ni content is preferably controlled to be in the range of 0.01 to 0.50%.

Nb: 0.005 to 0.10%

Niobium contributes to increasing bendability and strength by contributing to reducing the size of austenite grains and thereby refining the microstructure of finally obtainable steel sheets. In order to obtain these effects, the Nb content needs to be not less than 0.005%. If the Nb content exceeds 0.10%, however, the formation of coarse precipitates is facilitated with the result that ductility and bendability are lowered. Thus, when niobium is contained, the Nb content is preferably controlled to be in the range of 0.005 to 0.10%.

V: 0.002 to 0.50%

Vanadium facilitates the formation of a bainite phase through an improvement in hardenability, thereby contributing to increasing bendability and strength. In order to obtain these effects, the V content needs to be not less than 0.002%. On the other hand, any excessive content exceeding 0.50% leads to an increase in the amounts of coarse precipitates and a consequent decrease in bendability. Thus, when vanadium is contained, the V content is preferably controlled to be in the range of 0.002 to 0.50%. The V content is more preferably in the range of 0.05 to 0.40%.

Mo: 0.02 to 0.50%

Molybdenum contributes to increasing bendability and strength by improving hardenability and thereby facilitating the formation of a bainite phase. In order to obtain these effects, the Mo content needs to be not less than 0.02%. If the Mo content exceeds 0.50%, however, the formation of a martensite phase is facilitated with the result that bendability is lowered. Thus, when molybdenum is contained, the Mo content is preferably controlled to be in the range of 0.02 to 0.50%.

Cr: 0.03 to 0.50%

Chromium facilitates the formation of a bainite phase through an improvement in hardenability, thereby contributing to increasing bendability and strength. In order to obtain these effects, the Cr needs to be added at not less than 0.03%. If the Cr content exceeds 0.50%, however, the formation of a martensite phase is facilitated with the result that bendability is lowered. Thus, when chromium is contained, the Cr content is preferably controlled to be in the range of 0.03 to 0.50%.

B: 0.0002 to 0.0050%

Boron suppresses the formation and growth of ferrite originating at austenite grain boundaries and facilitates the formation of a bainite phase through an improvement of hardenability, thereby contributing to increasing bendability and strength. These effects are obtained by containing boron at not less than 0.0002%. However, the boron content in excess of 0.0050% results in a decrease in workability. Thus, when boron is contained, the B content is preferably controlled to be in the range of 0.0002 to 0.0050%.

In the present invention, the steel sheet may appropriately contain Ca and REM as effective elements for controlling the shape of sulfides to be spherical and improving bendability.

Ca: 0.0003 to 0.005%

Calcium is an element that effectively remedies adverse effects of sulfides on bendability by controlling the shape of sulfides to be spherical. This effect can be obtained at not less than 0.0003%. However, any Ca content in excess of 0.005% leads to an increase in the amounts of inclusions and the like and causes not only a decrease in bendability but also the occurrence of surface defects. Thus, when calcium is contained, the Ca content is preferably controlled to be in the range of 0.0003 to 0.005%.

REM: 0.0003 to 0.0100%

Similarly to calcium, rare earth metals (REM) are elements that effectively remedy adverse effects of sulfides on bendability by controlling the shape of sulfides to be spherical. This effect can be obtained by containing a rare earth metal at not less than 0.0003%. However, any REM content of 0.0100% or above leads to an increase in the amounts of inclusions and causes not only a decrease in bendability but also a raised probability of the occurrence of surface defects. Thus, when REM is contained, the REM content is preferably controlled to be in the range of 0.0003 to 0.0100%.

The balance after the deduction of the aforementioned elements is represented by Fe and inevitable impurities.

Next, the microstructure of embodiments of the inventive high strength steel sheets will be described.

The microstructure of the inventive steel sheet is such that surface portions on the front and back surfaces of the steel sheet (hereinafter, simply surface regions) preferably sandwich the microstructure of an inner portion of the steel sheet other than the surface regions (hereinafter, simply inner region) between the front and back sides of the steel sheet.

In the invention, each of the surface regions preferably extends to a depth of 1.5 to 3.0% relative to the total sheet thickness, and the remaining inner portion of the steel sheet is defined as the inner region. The reasons why the surface regions are defined as extending to a depth of 1.5 to 3.0% relative to the total sheet thickness are because if the depth is less than 1.5%, the extent of the surface regions which are mild is so small that bendability is lowered to cause the occurrence of cracks during bending, as well as because if the surface regions which are mild are present to an excessive extent exceeding 3.0%, the strength of the steel sheet as a whole is lowered to fail to achieve a desired tensile strength of 780 MPa. Thus, the surface regions are specified to extend to a depth of 1.5 to 3.0% relative to the total sheet thickness.

Regarding the microstructure of the surface regions, it is necessary that the area fraction of bainite be less than 80% and the area fraction of ferrite with a grain diameter of 2 to 15 µm be not less than 10%. If the bainite area fraction is 80% or above or the ferrite area fraction is less than 10%, the surface regions do not become sufficiently mild and desired bendability cannot be obtained.

If the grain diameter of ferrite is in excess of 15 µm, cracks occur easily at ferrite grain boundaries to cause a decrease in bendability. If the grain diameter of ferrite is less than 2 µm, the surface regions do not exhibit sufficient workability, thus again failing to achieve sufficient bendability.

On the other hand, it is necessary that the main phase of the inner region be a bainite phase having an area fraction of more than 95% relative to the entire microstructure of the inner region. Because, if the bainite phase fraction is 95% or less, desired high strength and good bendability cannot be ensured stably. The microstructure preferably contains the bainite phase at not less than 98%, and is more preferably a bainite single phase.

If the bainite phase as the main phase has an average grain diameter in excess of 3 µm, there is a risk for the steel sheet to fail to exhibit excellent bendability. Thus, it is preferable to control the average grain diameter to be not more than 3 µm. The average grain diameter is more preferably not more than 2 µm.

Besides bainite as the main phase, the microstructure can possibly contain a second phase including ferrite, martensite, pearlite, retained austenite, cementite and the like. An increase in the average grain diameter of the second phase in excess of 3 µm raises the probability of occurrence of cracks originating at a boundary between the main phase and the second phase, resulting in a decrease in bendability. Thus, it is preferable that, the average grain diameter of the second phase be not more than 3 µm.

The inventive hot rolled steel sheet configured to have the above microstructure can achieve a high strength of not less than 780 MPa in terms of tensile strength as well as excellent bendability.

Next, the method for manufacturing high strength hot rolled steel sheets according to embodiments of the present invention will be described.

Steel material may be manufactured by any method without limitation. Any common method may be adopted in which a molten steel having the above composition is produced by melting in a furnace such as a converter or an electric furnace, preferably subjected to secondary refining in a vacuum degassing furnace, and cast into a steel material such as a slab by continuous casting or the like.

Heating Temperature for Steel Material: 1200 to 1350° C., with Holding Time of not Less than 1200 Seconds In a steel material such as a slab, carbonitride-forming elements such as titanium are present mostly as coarse carbonitrides. Such coarse precipitates lower bendability. It is therefore important to dissolve them prior to hot rolling. For this purpose, it is necessary to heat the steel material at not less than 1200° C. On the other hand, heating at a temperature in excess of 1350° C. generates a large amount of scales. As a result, the surface quality is deteriorated by, for example, scale marks. Thus, the heating temperature for the steel material is limited to be in the range of 1200 to 1350° C. The heating temperature is preferably in the range of 1250 to 1350° C.

If the holding time for the steel material at the heating temperature is less than 1200 seconds, carbides and nitrides are not sufficiently dissolved in the steel material, resulting in a decrease in bendability. Thus, in the invention, the holding time for the steel material at the above heating temperature is preferably limited to be not less than 1200 seconds.

It is not particularly necessary to stipulate the upper limit of the holding time. However, any holding time in excess of 6000 seconds increases the amount of generated scales and leads to a deterioration in surface quality due to, for example, scale marks. Thus, the holding time is preferably controlled to be not more than 6000 seconds.

Rough Rolling End Temperature: Not Less than 1050° C.

If the rough rolling end temperature is less than 1050° C., the degree of decarburization of the surface regions becomes insufficient and the microstructure of the surface regions cannot be made mild, thereby failing to achieve sufficient bendability. Thus, the rough rolling end temperature is limited to be not less than 1050° C., and preferably not less than 1070° C.

Finish Rolling End Temperature: 830 to 930° C.

If the finish rolling end temperature (the finish temperature) is less than 830° C., rolling takes place while the temperature is in a two-phase, namely, ferrite+austenite region. As a result, worked microstructures remain after the rolling to cause a decrease in bendability. If the finish temperature is in excess of 930° C., the size of austenite grains becomes so large that a coarse microstructure results after cooling, thus resulting in a decrease in bendability. Thus, the upper limit is specified to be 930° C. The finally obtainable microstructure is refined and bendability is improved as the finish temperature becomes lower. Thus, the finish temperature is preferably not more than 880° C.

Average Rate of Cooling from Finish Temperature to Coiling Temperature: Not Less than 35° C./s If the average rate of cooling to the coiling temperature is less than 35° C./s, the formation of ferrite progresses to a marked extent and pearlite is formed in the steel sheet with the results that not only bendability is lowered but also the strength of the steel sheet is reduced. Thus, the average rate of cooling from the finish rolling temperature to the coiling temperature is limited to be not less than 35° C./s. If the average cooling rate is 55° C./s or above, however, there is a risk that the microstructure of the surface regions does not have a desired ferrite fraction. Thus, it is preferable that the average cooling rate be controlled to be less than 55° C./s.

Coiling Temperature: 350 to 550° C.

If the coiling temperature is less than 350° C., hard martensite and retained austenite are formed in such large amounts in the steel that bendability is lowered. Thus, the lower limit of the coiling temperature is specified to be 350° C.

The coiling temperature is preferably not less than 380° C. On the other hand, the coiling temperature above 550° C. increases the amount of pearlite in the microstructure in the steel sheet, thereby causing a marked decrease in bendability. Thus, the coiling temperature is limited to be not more than 550° C. Because the formation of fine bainite phase is facilitated as the temperature becomes lower, the coiling temperature is preferably not more than 480° C.

After being coiled, the hot rolled sheet may be temper rolled by a common method, or may be pickled to remove scales. Further, the steel sheet may be subjected to a plating treatment such as hot dip galvanization and electrogalvanization or a chemical conversion treatment.

EXAMPLES

Steels which had a composition described in Table 1 were produced by melting in a converter and were cast into slabs (steel materials) by continuous casting. These steel materials were subjected to treatments including such as heating, hot rolling, cooling and coiling under conditions described in Table 2, thereby forming hot rolled steel sheets. Some of the hot rolled steel sheets were pickled to remove scales from the surface. Test pieces were sampled from the obtained hot rolled steel sheets and were analyzed by the following methods to determine the microstructure fractions and the grain diameter. Further, a tensile test was carried out to determine the yield point (YP), the tensile strength (TS) and the elongation (EL). Furthermore, a bending test was performed to evaluate R/t as an indicator of bendability.

Microstructure Fractions

To determine the microstructure fractions, a cross section along the sheet thickness that was parallel to the rolling direction was etched with a 3% Nital solution to expose the microstructure, and portions in the vicinity of the surface were observed at a relatively low magnification of 1000× to 2000× to identify the surface regions. The surface regions were able to be distinguished from the inner region based on the facts that ferrite was observed in the surface regions and the grain diameters of bainite in the surface regions were larger than that in the inner region. When the distinction was difficult in COMPARATIVE EXAMPLES, the surface regions were defined as extending to a depth of 2.5% relative to the sheet thickness.

After the identification of the surface regions, three fields of view were observed at 3000× magnification and the images were processed to quantitatively determine the area fraction of each phase. Further, in the inner region, three fields of view were captured at 3000× magnification using a scanning electron microscope (SEM) with respect to a portion found at ¼ of the sheet thickness. The images were processed to quantitatively determine the area fraction of each phase.

Grain Diameter of Each Phase

The SEM picture used in the determination of the microstructure fractions was processed such that two straight lines were drawn orthogonally to each other with an angle of 45° relative to the sheet thickness direction and with a length of 80 mm. The length of each segment of the straight lines that intersected with an individual grain of a bainite phase or a ferrite phase was measured. The average value of the obtained segment lengths was determined as an average grain diameter of the ferrite phase or an average grain diameter of the bainite phase.

Tensile Test

A JIS No. 5 test piece (GL: 50 mm) was sampled such that the tensile direction would be perpendicular to the rolling direction. A tensile test was carried out by a method in accordance with JIS Z 2241 to determine the yield point (YP), the tensile strength (TS) and the elongation (EL).

Bending Test

A 20 mm×150 mm bending test piece was obtained by shearing the hot rolled sheet such that the longer side of the test piece would be perpendicular to the rolling direction. This sample with a shear edge was subjected to a 180° bending test in accordance with a pressing bend method described in JIS Z 2248. In the test, the minimum bending radius without occurrence of a crack for n=3 test pieces was defined as a critical bending radius R (mm). The critical bending radius R (mm) was divided by the sheet thickness t (mm) to give an R/t value, based on which the bendability of the steel sheet was evaluated. In the invention, it can be said that steels with an R/t value of not more than 0.5 are excellent in bendability. The obtained results are described in Table 3.

TABLE 1

| Steel code | Chemical composition (mass %) | | | | | | | | | Remarks |
| | C | Si | Mn | P | S | Al | N | Ti | Others | |
| --- | --- | --- | --- | --- | --- | --- | --- | --- | --- | --- |
| A | 0.08 | 0.65 | 1.6 | 0.01 | 0.0007 | 0.010 | 0.003 | 0.08 | — | Appropriate steel |
| B | 0.10 | 0.55 | 1.3 | 0.01 | 0.0010 | 0.020 | 0.003 | 0.10 | — | Appropriate steel |
| C | 0.09 | 0.70 | 1.4 | 0.01 | 0.0020 | 0.010 | 0.002 | 0.09 | Cu: 0.05, Ni: 0.1 | Appropriate steel |
| D | 0.10 | 0.60 | 1.2 | 0.01 | 0.0010 | 0.010 | 0.003 | 0.05 | Nb: 0.03 | Appropriate steel |
| E | 0.08 | 0.80 | 1.4 | 0.01 | 0.0010 | 0.010 | 0.003 | 0.08 | Cr: 0.2, Ca: 0.0008 | Appropriate steel |
| F | 0.07 | 0.50 | 1.8 | 0.01 | 0.0010 | 0.010 | 0.002 | 0.10 | B: 0.0010 | Appropriate steel |
| G | 0.09 | 0.60 | 1.6 | 0.01 | 0.0010 | 0.040 | 0.002 | 0.08 | Mo: 0.15 | Appropriate steel |
| H | 0.08 | 0.90 | 1.8 | 0.01 | 0.0010 | 0.020 | 0.003 | 0.07 | Ca: 0.0005, Cr: 0.2 | Appropriate steel |
| I | 0.05 | 0.50 | 2.0 | 0.01 | 0.0020 | 0.020 | 0.002 | 0.07 | REM: 0.0010 | Appropriate steel |
| J | 0.12 | 0.80 | 1.7 | 0.01 | 0.0010 | 0.020 | 0.002 | 0.09 | Cr: 0.3 | Appropriate steel |
| K | 0.10 | 0.80 | 1.8 | 0.01 | 0.0010 | 0.020 | 0.003 | 0.10 | Cr: 0.1, V: 0.20 | Appropriate steel |
| L | 0.03 | 0.60 | 1.2 | 0.01 | 0.0025 | 0.020 | 0.003 | 0.02 | — | Comp. steel |
| M | 0.08 | 0.70 | 2.5 | 0.01 | 0.0090 | 0.015 | 0.004 | 0.06 | — | Comp. steel |
| N | 0.06 | 0.45 | 0.7 | 0.01 | 0.0040 | 0.010 | 0.004 | 0.18 | — | Comp. steel |
| O | 0.20 | 0.65 | 1.8 | 0.01 | 0.0020 | 0.010 | 0.002 | 0.08 | — | Comp. steel |
| P | 0.07 | 0.55 | 1.5 | 0.01 | 0.0030 | 0.002 | 0.003 | 0.08 | — | Comp. steel |
| Q | 0.08 | 0.50 | 1.6 | 0.01 | 0.0030 | 0.200 | 0.003 | 0.08 | — | Comp. steel |

Note:
The balance of the steel composition is Fe and inevitable impurities.

TABLE 2

| Steel sheet code | Steel code | Heating temp. (° C.) | Holding time (s) | Rough rolling end temp. (° C.) | Finish temp. (° C.) | Cooling rate (° C./s) | Coiling temp. (° C.) | Sheet thickness (mm) | Remarks |
| --- | --- | --- | --- | --- | --- | --- | --- | --- | --- |
| A1 | A | 1260 | 1400 | 1080 | 870 | 38 | 430 | 2.3 | INV. EX. |
| A2 | A | 1280 | 1600 | 1080 | 880 | 35 | 450 | 4.5 | INV. EX. |
| A3 | A | 1260 | 1600 | 1070 | 850 | 38 | 620 | 3.4 | COMP. EX. |
| A4 | A | 1260 | 1500 | 1050 | 870 | 38 | 250 | 3.4 | COMP. EX. |

TABLE 2-continued

| Steel sheet code | Steel code | Heating temp. (° C.) | Holding time (s) | Rough rolling end temp. (° C.) | Finish temp. (° C.) | Cooling rate (° C./s) | Coiling temp. (° C.) | Sheet thickness (mm) | Remarks |
|---|---|---|---|---|---|---|---|---|---|
| A5 | A | 1260 | 1500 | 1060 | 960 | 38 | 470 | 3.2 | COMP. EX. |
| A6 | A | 1280 | 600 | 1070 | 870 | 20 | 470 | 3.2 | COMP. EX. |
| A7 | A | 1140 | 1500 | 1060 | 860 | 35 | 440 | 3.4 | COMP. EX. |
| A8 | A | 1260 | 1500 | 960 | 860 | 38 | 460 | 3.2 | COMP. EX. |
| B1 | B | 1260 | 1500 | 1060 | 860 | 35 | 430 | 2.6 | INV. EX. |
| C1 | C | 1260 | 1500 | 1070 | 830 | 40 | 430 | 1.8 | INV. EX. |
| D1 | D | 1280 | 1500 | 1050 | 860 | 38 | 430 | 2.0 | INV. EX. |
| E1 | E | 1270 | 1500 | 1080 | 860 | 35 | 520 | 5.6 | INV. EX. |
| F1 | F | 1260 | 1500 | 1080 | 840 | 38 | 480 | 3.6 | INV. EX. |
| G1 | G | 1260 | 1500 | 1070 | 860 | 37 | 450 | 4.0 | INV. EX. |
| H1 | H | 1260 | 1500 | 1050 | 860 | 37 | 450 | 6.0 | INV. EX. |
| I1 | I | 1260 | 1500 | 1050 | 870 | 37 | 445 | 8.0 | INV. EX. |
| J1 | J | 1260 | 1800 | 1080 | 860 | 40 | 440 | 2.0 | INV. EX. |
| K1 | K | 1260 | 1800 | 1080 | 860 | 40 | 430 | 2.0 | INV. EX. |
| L1 | L | 1260 | 1500 | 1050 | 870 | 37 | 450 | 2.6 | COMP. EX. |
| M1 | M | 1260 | 1500 | 1060 | 870 | 37 | 450 | 2.6 | COMP. EX. |
| N1 | N | 1260 | 1500 | 1060 | 860 | 37 | 430 | 2.6 | COMP. EX. |
| O1 | O | 1260 | 1500 | 1070 | 860 | 37 | 470 | 2.6 | COMP. EX. |
| P1 | P | 1260 | 1500 | 1060 | 860 | 37 | 460 | 2.6 | COMP. EX. |
| Q1 | Q | 1260 | 1500 | 1060 | 870 | 37 | 430 | 2.6 | COMP. EX. |

TABLE 3

| Steel sheet code | Steel code | TS (MPa) | EI (%) | R/t | Bainite fraction in inner region (%) | Bainite fraction in surface region (%) | Ferrite fraction in surface region (%) | Ferrite grain diameter in surface region (μm) | Pickling | Remarks |
|---|---|---|---|---|---|---|---|---|---|---|
| A1 | A | 812 | 18 | 0.22 | 100 | 55 | 30 | 6.5 | Performed | INV. EX. |
| A2 | A | 802 | 22 | 0.44 | 96 | 60 | 36 | 6.9 | Performed | INV. EX. |
| A3 | A | 755 | 16 | 0.59 | 73 | 20 | 80 | 10.6 | Performed | COMP. EX. |
| A4 | A | 917 | 14 | 0.74 | 85 | 95 | 5 | 1.4 | Performed | COMP. EX. |
| A5 | A | 772 | 15 | 0.63 | 88 | 65 | 40 | 8.6 | Performed | COMP. EX. |
| A6 | A | 738 | 16 | 0.63 | 65 | 30 | 65 | 10.6 | Performed | COMP. EX. |
| A7 | A | 810 | 15 | 0.59 | 100 | 90 | 7 | 7.5 | Not performed | COMP. EX. |
| A8 | A | 810 | 18 | 0.63 | 98 | 85 | 9 | 5.6 | Performed | COMP. EX. |
| B1 | B | 790 | 19 | 0.19 | 100 | 60 | 30 | 4.6 | Performed | INV. EX. |
| C1 | C | 842 | 16 | 0.28 | 100 | 70 | 28 | 4.4 | Performed | INV. EX. |
| D1 | D | 789 | 18 | 0.25 | 100 | 56 | 44 | 6.8 | Performed | INV. EX. |
| E1 | E | 835 | 21 | 0.27 | 100 | 72 | 28 | 8.9 | Not performed | INV. EX. |
| F1 | F | 846 | 17 | 0.42 | 100 | 55 | 40 | 3.8 | Performed | INV. EX. |
| G1 | G | 870 | 15 | 0.25 | 100 | 60 | 36 | 3.5 | Performed | INV. EX. |
| H1 | H | 840 | 16 | 0.17 | 96 | 62 | 30 | 6.5 | Not performed | INV. EX. |
| I1 | I | 825 | 18 | 0.25 | 100 | 74 | 24 | 4.3 | Not performed | INV. EX. |
| J1 | J | 1030 | 15 | 0.43 | 100 | 60 | 36 | 6.5 | Performed | INV. EX. |
| K1 | K | 1060 | 14 | 0.43 | 100 | 69 | 25 | 4.8 | Performed | INV. EX. |
| L1 | L | 590 | 22 | 0.96 | 30 | 10 | 90 | 16.2 | Performed | COMP. EX. |
| M1 | M | 830 | 14 | 1.15 | 85 | 60 | 32 | 4.6 | Performed | COMP. EX. |
| N1 | N | 760 | 10 | 1.15 | 52 | 10 | 80 | 18.2 | Not performed | COMP. EX. |
| O1 | O | 1025 | 9 | 0.96 | 92 | 86 | 10 | 3.2 | Performed | COMP. EX. |
| P1 | P | 793 | 15 | 0.77 | 100 | 68 | 30 | 6.5 | Performed | COMP. EX. |
| Q1 | Q | 823 | 16 | 0.58 | 100 | 70 | 28 | 5.5 | Performed | COMP. EX. |

As shown in Table 3, all of INVENTIVE EXAMPLES exhibited excellent strength and bendability, with a tensile strength (TS) of not less than 780 MPa and an R/t value of not more than 0.5. In contrast, COMPARATIVE EXAMPLES failed to satisfy both desired high strength and bendability with the tensile strength (TS) being less than 780 MPa or the R/t value being in excess of 0.5.

The invention claimed is:

1. A high strength hot rolled steel sheet with excellent bendability, which has a composition comprising, in terms of mass %, C at 0.05 to 0.15%, Si at 0.2 to 1.2%, Mn at 1.0 to 2.0%, P at not more than 0.04%, S at not more than 0.0030%, Al at 0.005 to 0.10%, N at not more than 0.005% and Ti at 0.03 to 0.13%, the balance being represented by Fe and inevitable impurities, includes surface regions having an area fraction of bainite of less than 80% and an area fraction of a ferrite phase with a grain diameter of 2 to 15 μm of not less than 10%, the surface regions extending from front and back surfaces of the steel sheet each to a depth of 1.5 to 3.0% relative to a total sheet thickness, as well as an inner region other than the surface regions having an area fraction of a bainite phase of more than 95%, and has a tensile strength of not less than 780 MPa, wherein the total sheet thickness is from 8.0 mm or less to 1.8 mm or more, and a minimum bending radius without occurrence of a crack defined as a critical bending radius R in mm, divided by the total sheet thickness t in mm given as an R/t value, is from 0.5 or less to 0.17 or more.

2. The high strength hot rolled steel sheet with excellent bendability according to claim 1, wherein the composition of the steel sheet further comprises, in terms of mass %, one, or two or more selected from Cu at 0.01 to 0.20%, Ni at 0.01 to 0.50%, Nb at 0.005 to 0.10%, V at 0.002 to 0.50%, Mo at 0.02 to 0.50%, Cr at 0.03 to 0.50% and B at 0.0002 to 0.0050%.

3. The high strength hot rolled steel sheet with excellent bendability according to claim 1, wherein the composition of the steel sheet further comprises, in terms of mass %, one or both selected from Ca at 0.0003 to 0.005% and REM at 0.0003 to 0.0100%.

4. A method for manufacturing high strength hot rolled steel sheets with excellent bendability, comprising:

heating a steel material to a temperature of 1200 to 1350° C., the steel material having a composition comprising, in terms of mass %, C at 0.05 to 0.15%, Si at 0.2 to 1.2%, Mn at 1.0 to 2.0%, P at not more than 0.04%, S at not more than 0.0030%, Al at 0.005 to 0.10%, N at not more than 0.005% and Ti at 0.03 to 0.13%, the balance being represented by Fe and inevitable impurities, holding the steel material at the temperature for not less than 1200 seconds, then hot rolling the steel material to a steel sheet at a rough rolling end temperature of not less than 1050° C. and a finish rolling end temperature of 830 to 930° C., and after completion of the hot rolling cooling the steel sheet to a coiling temperature of 350 to 550° C. at an average cooling rate of not less than 35° C./s, wherein the resulting steel sheet includes surface regions having an area fraction of bainite of less than 80% and an area fraction of a ferrite phase with a grain diameter of 2 to 15 µm of not less than 10%, the surface regions extending from front and back surfaces of the steel sheet each to a depth of 1.5 to 3.0% relative to a total sheet thickness, as well as an inner region other than the surface regions having an area fraction of a bainite phase of more than 95%, and has a tensile strength of not less than 780 MPa, wherein the total sheet thickness is from 8.0 mm or less to 1.8 mm or more, and a minimum bending radius without occurrence of a crack defined as a critical bending radius R in mm, divided by the total sheet thickness t in mm given as an R/t value, is from 0.5 or less to 0.17 or more.

* * * * *